July 11, 1967 N. FROST 3,330,322
CLUTCH PURSE AND THE METHOD OF MAKING THE SAME
Filed April 8, 1965 2 Sheets-Sheet 1
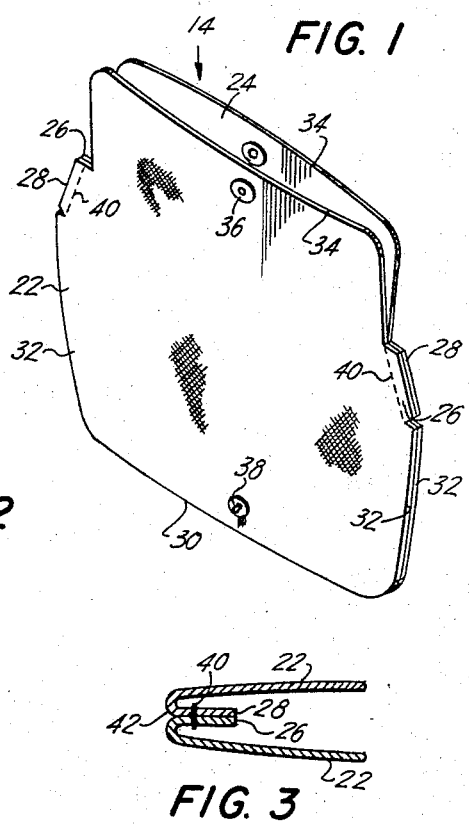
FIG. 1
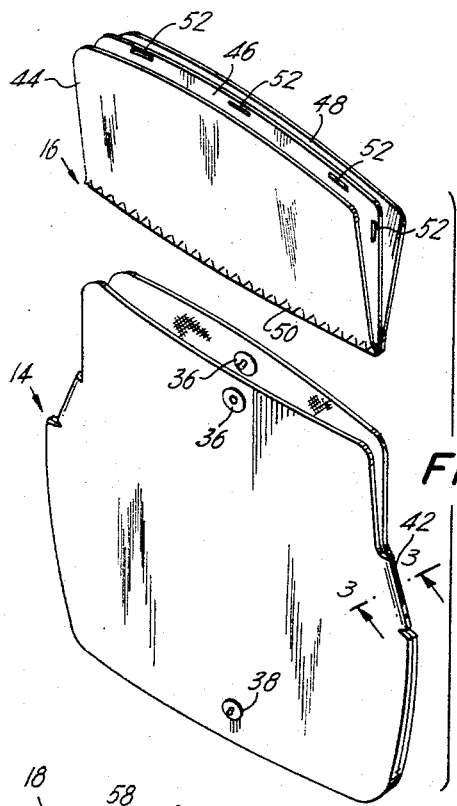
FIG. 2
FIG. 3
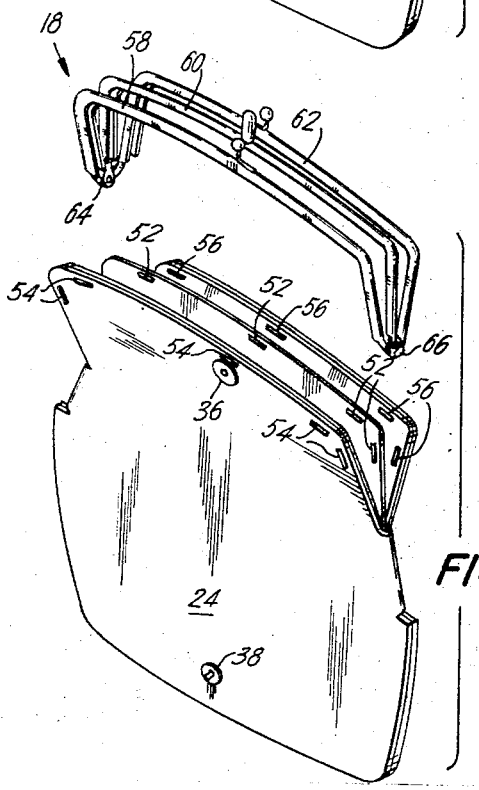
FIG. 4
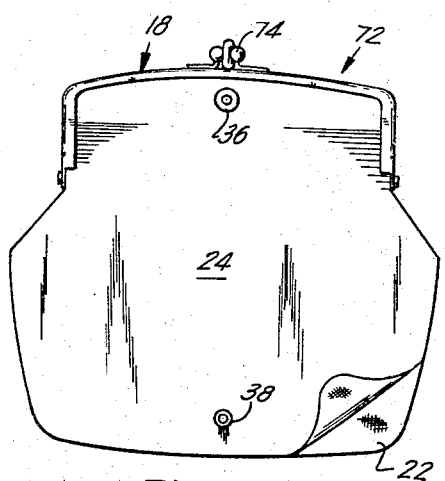
FIG. 5
INVENTOR.
NORBET FROST
BY
Friedman & Goodman
ATTORNEYS

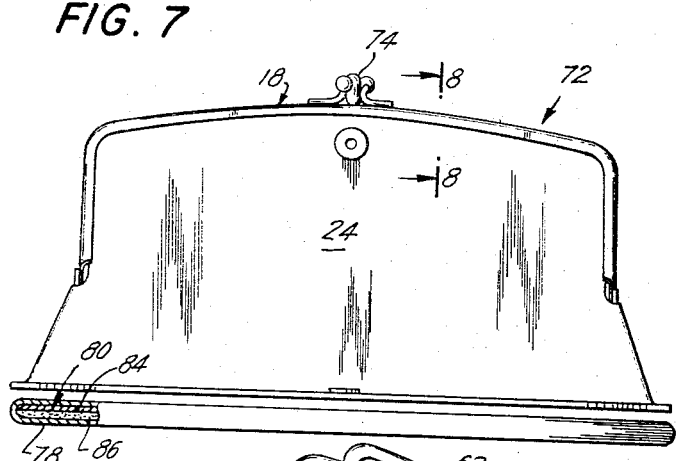
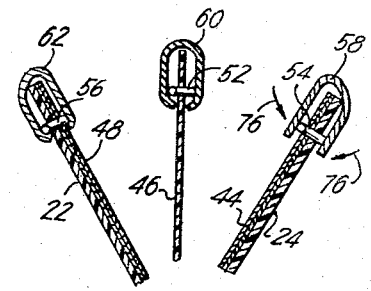
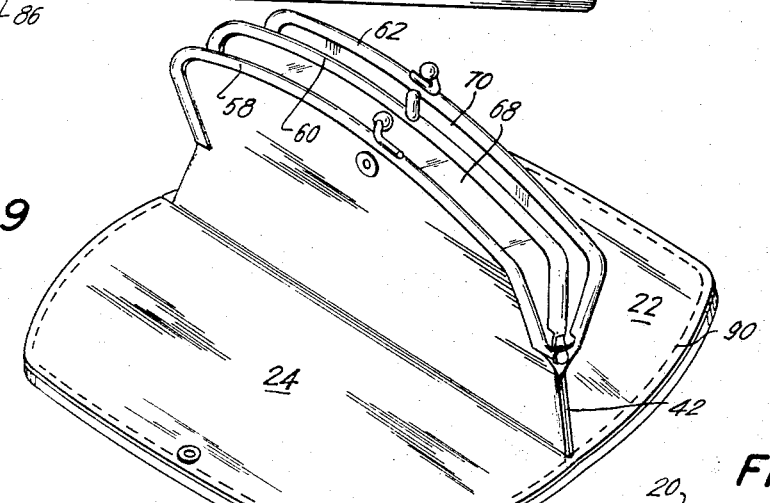
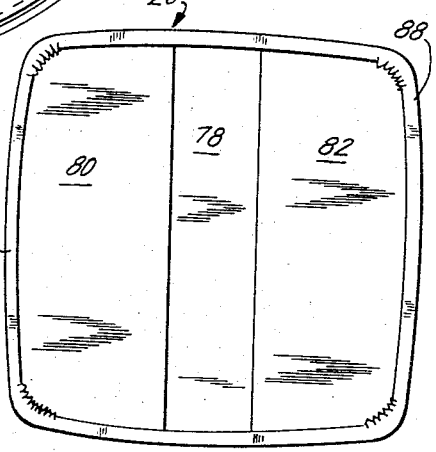
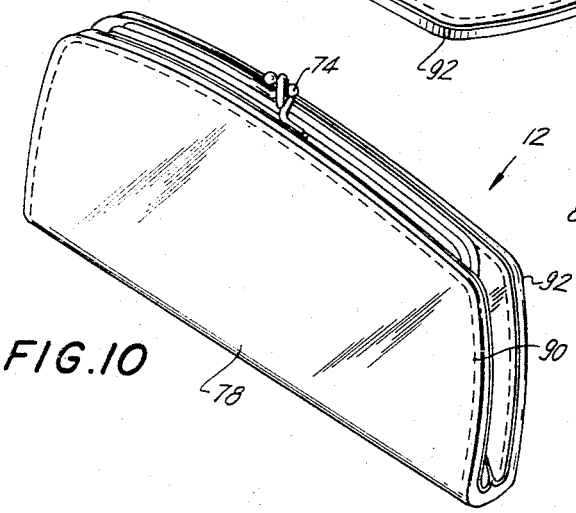

United States Patent Office 3,330,322
Patented July 11, 1967

3,330,322
CLUTCH PURSE AND THE METHOD OF
MAKING THE SAME
Norbet Frost, New York, N.Y., assignor to Adam-Steven
Leather Goods Inc., a corporation of New York
Filed Apr. 8, 1965, Ser. No. 446,566
6 Claims. (Cl. 150—29)

The present invention relates in general to a clutch bag or a clutch purse and in particular to novel structural details thereof.

It is an object of the present invention to provide a simple and inexpensive means for forming gussets, or the like, in a lady's clutch bag or clutch purse or the like.

It is another object of the present invention to provide a simple, efficient and inexpensive means for framing a lady's clutch bag or purse.

Other and further objects and advantages of the present invention will become readily apparent to one skilled in the art from a consideration of the following specification taken in connection with the appended drawings.

In the drawings, which illustrate the best mode presently contemplated for carrying out the invention:

FIGURE 1 is a perspective view of a pair of blanks from which the body of the clutch bag is formed, the blanks being secured together pursuant to the present invention;

FIGURE 2 is an exploded view showing the body blanks and associated pocket partitions;

FIGURE 3 is a sectional view on an enlarged scale taken on the line 3—3 of FIGURE 2;

FIGURE 4 is a view similar to FIGURE 2 and illustrates the step of framing the pocket partitions and the body blanks;

FIGURE 5 is an elevation view showing the frame positioned on the purse body;

FIGURE 6 is a plan view of a bead forming unit which is secured to the purse body;

FIGURE 7 is a view partially in elevation and partially in section and illustrates the assembly of the purse blank with an assembled bead forming unit;

FIGURE 8 is a sectional view on an enlarged scale taken on the line 8—8 of FIGURE 7;

FIGURE 9 is a perspective view of the purse in the open condition thereof; and

FIGURE 10 is a perspective view of the purse in the closed condition thereof.

Referring now to the drawings in detail, there is illustrated in FIGURES 9 and 10 in a clutch bag or purse 12 pursuant to the present invention. The various parts which form the bag are illustrated in FIGURES 2, 4 and 6. As here shown, these parts comprise a clutch bag body 14, a partition assembly 16, a frame 18, and an outer wall assembly 20.

The bag body 14 is formed of a pair of similar body blanks 22-24 (FIGURE 1), formed of any suitable sheet material, for example, plastic, fabric or leather. Each body blank, pursuant to the present invention, is provided with a pair of gusset-forming tabs 26–28, a bottom edge 30, opposing side edges 32 between each tab and the bottom edge, and a top edge 34 which extends between the pair of tabs. Each blank 22 is provided also with a female snap fastener 36 and a male snap fastener 38.

The first step in the formation of the clutch bag is to dispose the body blanks in surface to surface disposition as shown in FIGURE 1, and to secure the associated tab pairs 26–28 together, as by the lines of stitching 40. The secured together blanks are then turned inside out or reversed, as shown in FIGURE 2 so as to provide gussets 42 resulting from the inwardly extending mutually secured tab pairs, as best shown in FIGURE 3.

The formation of gussets in prior art purse bags was a timely and costly operation. These disadvantages of prior art bags are avoided by the simple method involving sewing together paired tabs on body blanks which are then turned inside out.

The partition assembly 16 is formed of three complementary sheet material members 44, 46 and 48, secured together along their bottom edges, as by stitching 50. In the present embodiment, while all three partition members are flexible, the outer members 44 and 48 are more flexible than the intermediate member 46. Pursuant to a highly novel aspect of the present invention, the intermediate member 46 is provided along its free marginal edges with wire staples 52.

Thereafter, the partition assembly 16 is inserted into the upper end of the bag body 14, as shown in FIGURE 4. The free marginal edges of partition member 44 are secured by wire staples 54 to the adjacent marginal edges of the abutting body blank 24 and the free marginal edges of the partition member 48 are secured by wire staples 56 to the adjacent marginal edges of its abutting body blank 22.

The staples 52, 54 and 56 function as anchors for the three section purse frame 18. Frame 18 is of conventional construction and as here shown comprises three U-shaped frame elements 58, 60 and 62 which are pivoted together as at 64 and 66. Frame element 58 encompasses the upper marginal edges of blank 24 and partition member 44 and, when clamped thereover, is securely retained in position by the staples 54 which serve to anchor said frame element. Frame element 60 encompasses the upper edge of the intermediate partition member 46 and, when clamped thereover, is securely retained in position by the staples 52 which serve to anchor said frame element. Frame element 62 encompasses the upper marginal edges of blank 22 and partition member 48 and, when clamped thereover, is securely retained in position by the staples 56 which serve to anchor said frame element.

The securement of the frame 18 to the partition assembly 16 and the bag body 14 results in the formation of a pair of pockets 68 and 70, as best shown in FIGURE 9. The assembled bag body, partition assembly and frame form a framed bag body assembly 72, as best illustrated in FIGURE 5. The pockets 68 and 70 may be closed by a conventional frame finger lock 74.

The framing of a bag body has heretofore required the services of expert and experienced operators. It was necessary to carefully insert the various portions into the frame elements. This was rendered difficult due to the fact that the prior art sewn type gussets would permit the bag body material to curl. Pursuant to the present invention, the use of inverted sewn tabs reduces the curling of the material so that the partition members and the body blanks can be assembled with the frame by relatively inexperienced operators. The relative ease of operation is illustrated in FIGURE 8 where the body blank 24 and the partition member 44 are shown inserted into the open frame element 58 which is then clamped thereover, as shown by the arrows 76 to be anchored by staples 54.

The bag 12 is completed by assembling the framed bag body assembly with the previously mentioned outer wall assembly 20. The assembly 20, as here shown, comprises an outer wall member 78 of substantially rectangular conformation and preferably formed of sheet material similar to body blanks 22 and 24. On its inner surface, the outer wall is provided with a pair of laterally spaced inserts 80 and 82. Each insert comprises a backing element 84, preferably formed of cardboard, or the like, which is provided with a resilient pad 86 (FIGURE 7) in abutment with the inner surface of outer wall member 78. The marginal edges 88 of wall member 78 are bent over the inserts 80 and 82 and adhesively secured thereto.

In order to complete the bag 12, the framed body assembly 72 is disposed over the outer wall assembly 20, as shown in FIGURE 7. Both assemblies are secured together by a continuous line of stitching 90 so as to form a continuous peripheral bead 92 for the bag 12. It will be apparent that lock 74 is closed in order to close pockets 68 and 70 and then the purse 12 may be closed by snap engaging the fasteners 36 and 38.

In view of the foregoing, it will be apparent that there has been illustrated and described a novel purse bag construction and a novel method for forming the same. It will be understood that various changes and modifications may be made therein without, however, departing from the basic inventive concepts thereof, as set forth in the appended claims.

I claim:

1. In a purse, a pair of body blanks secured together to define a body assembly open at one end thereof, a partition assembly disposed in said open end, said partition assembly having a pair of partition members secured together along one marginal edge thereof, a first set of staples inter-connecting one of said partition members to one of said body blanks along free marginal edges thereof, a second set of staples inter-connecting the other of said partition members to the other of said body blanks along free marginal edges thereof, and a pivoted purse frame assembly having a first frame element clamped over said first set of staples and a second frame element clamped over said second set of staples.

2. In a purse, a pair of body blanks secured together to define a body assembly open at one end thereof, a partition assembly disposed in said open end, said partition assembly having a pair of partition members secured together along one marginal edge thereof, a first set of staples inter-connecting one of said partition members to one of said body blanks along free marginal edges thereof, a second set of staples inter-connecting the other of said partition members to the other of said body blanks along free marginal edges thereof, and a pivoted purse frame assembly having a first frame element clamped over said first set of staples and a second frame element clamped over said second set of staples, said partition assembly having an intermediate partition member between said pair of partition members, said intermediate partition member having a marginal edge, a third set of staples secured along the free marginal edge of said intermediate partition member, and said frame assembly having an intermediate frame element clamped over said third set of staples.

3. In a purse, a pair of body blanks secured together to define a body assembly open at one end thereof, a partition assembly disposed in said open end, said partition assembly having a pair of partition members secured together along one marginal edge thereof, a first set of staples inter-connecting one of said partition members to one of said body blanks along free marginal edges thereof, a second set of staples inter-connecting the other of said partition members to the other of said body blanks along free marginal edges thereof, and a pivoted purse frame assembly having a first frame element clamped over said first set of staples and a second frame element clamped over said second set of staples, each of said body blanks having a tab extending laterally from each of the opposing side edges thereof, said blanks being disposed in face-to-face relation so that both of the tabs of one blank are paired with the tabs of the other blank and the paired tabs being secured together in position between said blanks to form gussets.

4. In a purse, a pair of body blanks secured together to define a body assembly open at one end thereof, a partition assembly disposed in said open end, said partition assembly having a pair of partition members secured together along one marginal edge thereof, a first set of staples inter-connecting one of said partition members to one of said body blanks along free marginal edges thereof, a second set of staples inter-connecting the other of said partition members to the other of said body blanks along free marginal edges thereof, and a pivoted purse frame assembly having a first frame element clamped over said first set of staples and a second frame element clamped over said second set of staples, said partition assembly having an intermediate partition member between said pair of partition members, said intermediate partition member having a marginal edge, a third set of staples secured along the free marginal edge of said intermediate partition member, and said frame assembly having an intermediate frame element clamped over said third set of staples, each of said body blanks having a tab extending laterally from each of the opposing side edges thereof, said blanks being disposed in face-to-face relation so that both of the tabs of one blank are paired with the tabs of the other blank, and the paired tabs being secured together in position between said blanks to form gussets.

5. The method of forming a purse comprising providing a pair of body blanks which are secured together along opposite side edges thereof to define a body assembly open at one end thereof, providing a partition assembly having a pair of partition members secured together along one marginal edge thereof, inserting the secured edges of said partition assembly into the open end of said body assembly, stapling the free edge of said partition members to the free edge of the adjacent body blank, providing a pivoted purse frame having a pair of frame elements, clamping one frame element over each pair of stapled free edges.

6. The method set forth in claim 5, wherein provision is made for a partition assembly having an intermediate partition member and a frame assembly having an intermediate frame element, providing staples along the free edges of said intermediate member and clamping said intermediate frame element over the free edge of said intermediate member.

References Cited
UNITED STATES PATENTS
573,332    12/1896    Kress _____ 150—32

FOREIGN PATENTS
198,907    8/1958    Austria.

FRANKLIN T. GARRETT, *Primary Examiner.*